W. R. BENJAMIN.
CHECK VALVE.
APPLICATION FILED FEB. 14, 1917.

1,287,618.

Patented Dec. 17, 1918.

WITNESSES
Jas. K. McCathran
F. T. Chapman

Walter R. Benjamin, INVENTOR

BY *(signature)*

ATTORNEY

UNITED STATES PATENT OFFICE.

WALTER ROGERS BENJAMIN, OF CHINOOK, MONTANA.

CHECK-VALVE.

1,287,618.
Specification of Letters Patent.
Patented Dec. 17, 1918.

Application filed February 14, 1917. Serial No. 148,670.

*To all whom it may concern:*

Be it known that I, WALTER R. BENJAMIN, a citizen of the United States, residing at Chinook, in the county of Blaine and State of Montana, have invented a new and useful Check-Valve, of which the following is a specification.

This invention has reference to check valves and its object is to provide a check valve the body of which consists of an ordinary straight pipe coupling whereby the check valve may be included in any ordinary pipe system and may be cheaply constructed because made in the main of standard parts obtainable at any time upon the market.

In accordance with the present invention the body of the check valve consists of an ordinary straight pipe coupling adapted to receive the threaded ends of two pipes without interference with the check valve. The coupling has a bushing screwed therein to an intermediate position and this bushing has one face formed into a valve seat to which there is applied a valve having means for holding it against escape from the valve seat, but permitting such movements of the valve with relation to the valve seat as will permit one way passage of fluid through the check valve.

The check valve of the invention is particularly advantageous for use in connection with driven wells, where it is essential that the exterior of the driven pipe be substantially uniform. Heretofore, driven-well check valves have been wholly separate from the pipe in which they are installed, being provided with exterior packing relied upon to hold the valve structure in place within the pipe, such structure being pushed down into the pipe to the desired point. The pipe is often rough on the interior and this is destructive to the packing, usually rubber, as the valve is pushed down inside of the pipe, and, furthermore, rubber deteriorates quite rapidly. The valve of this invention is made a part of the pipe before the pipe is driven, and connects contiguous parts of the pipe. The valve can be used close to the bottom of the pipe, just above the strainer, and may have a life as long as that of the well, since it contains no parts subject to rapid deterioration.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—

Figure 1:
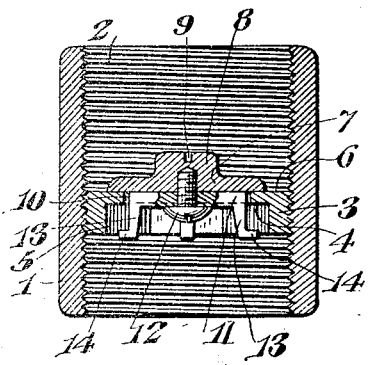
Figure 1 is a longitudinal section of a check valve constructed in accordance with the present invention.
Figure 3:
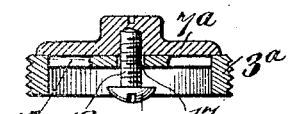
Fig. 3 is a cross-section of another form of check valve structure.
Figure 2:
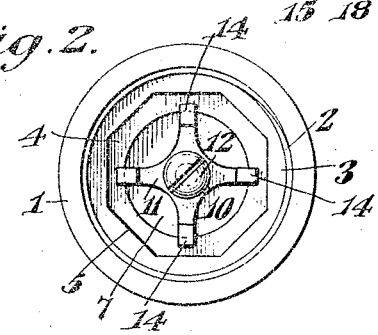
Fig. 2 is an end view of the check valve as viewed from the lower end of Fig. 1.
Figure 4:
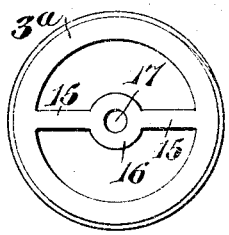
Fig. 4 is a plan view of a bushing such as shown in Fig. 3.

Referring to the drawings there is shown in Figs. 1 and 2 an ordinary straight pipe coupling 1 such as is readily obtainable in the open market. Such a pipe coupling is customarily employed for joining the adjacent ends of two pipes which are screwed into the opposite ends of the coupling, and such couplings are standardized for various sizes of pipes.

Such a pipe coupling is provided with interior threads 2 and adapted to the interiorly threaded portion of the coupling is a bushing 3 exteriorly threaded to match the threads 2. This bushing has a countersunk portion 4 with the walls 5 of the countersunk portion of polygonal outline, so that a suitable tool may be applied to the bushing and the latter be screwed into the coupling to the required extent.

It is desirable that the bushing shall remain in the position to which it is screwed into the coupling, wherefore the bushing is made to fit tightly in the coupling and considerable force is needed to screw it into the coupling to the required extent. The bushing therefore when once seated will retain the position to which it is placed against all liability of displacement under ordinary conditions of use.

That end of the bushing 3 remote from the polygonal walls 5 is formed into a valve seat 6 to which there is applied a valve 7 shown in Fig. 1 as a laterally extended block with a central boss 8 having a kerf or slot 9 therein for the application of a screw-driver. The bushing has a central passage 10 therethrough of suitable size and seated in this passage is the body portion of a spider 11 held to the valve 7 by a screw 12, or in any other suitable manner. The spider 11 is provided with angularly extended angle legs 13 having toe extremities 14 of sufficient spread to engage the bottom wall of the countersink 4 when the valve 7 is moved away from the valve seat 6 to the extent permitted by the length of the angle legs 13.

Such a check valve is customarily placed with the longitudinal axis of the coupling 1 upright, so that the valve 7 naturally gravitates upon the seat 6 and by properly grinding the meeting faces of the seat 6 and valve 7 the check valve may close fluid tight or substantially so. Such a check valve responds readily to fluid pressure applied in the proper direction and securely seats against the return flow of such fluid through the valve. The range of movement of the valve is determined by the length of the legs 13 and is checked in its movement by the engagement of the toes 14, which are outturned, with the inner wall of the countersink 4.

The parts of the check valve are in most part readily obtainable upon the market as cheaply as these parts could be manufactured for the sole purpose of producing check valves. The parts requiring special manufacture are very readily produced so that the whole check valve is capable of manufacture at a minimum price and because of the character of the structures employed a check valve constructed in accordance with the present invention can be manufactured more cheaply than any check valve as ordinarily constructed and having the capacity of the check valve of the present invention, which capacity is large for the size of device to which the check valve is adapted.

Instead of making the bushing 3 with a clean passage therethrough as in Figs. 1 and 2, there may be provided a bushing $3^a$ in the form of a ring with a diametrically disposed integral bar 15 thereacross, which bar has a central enlargement 16 with a central passage 17 therethrough. The bushing $3^a$ will take a valve $7^a$ similar to the valve 7 of Fig. 1, but which valve may be of greater diameter. The valve $7^a$ has a headed screw 18 applied thereto, the screw extending through the passage 17 and this screw is of sufficient length so that its head 19 forms a stop for the opening movements of the valve by engaging against the enlargement 16, and when the valve is seated the head 19 is spaced away from the enlargement 16.

Figure 5:
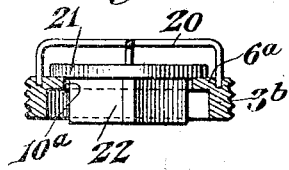
Fig. 5 is a cross-section with some parts in elevation of still another form of valve structure.

In Fig. 5 a bushing $3^b$ is shown, and this bushing may be similar to the bushing 3 of Fig. 1. This bushing has a valve seat $6^a$ corresponding to the valve seat 6 in Fig. 1 and projecting axially from the valve seat $6^a$ is a cage 20 confining a valve 21 to the seat but permitting sufficient movement of the valve away from the seat for the purposes of the invention. The valve 21 is formed with a guiding stem 22 extending through a central passage $10^a$ like the passage 10 of Fig. 1. The stem 22 is arranged after the customary manner to provide a guide for the valve and yet leave ample space for the passage of fluid about it.

What is claimed is:—

A check valve structure for use in driven well pipes to form part thereof, comprising a straight pipe coupling with interior screw threads extending from end to end, a one-piece ring-shaped screw bushing of an exterior diameter corresponding to the interior diameter and fitting the screw threads of the coupling and adjustable lengthwise thereof, and an upwardly yieldable check valve carried by the bushing.

In testimony, that I claim the foregoing as my own, I have hereto affixed my signature in the presence of two witnesses.

WALTER ROGERS BENJAMIN.

Witnesses:
JOHN MCLAREN,
HENRY J. O'HANLON.

Copies of this patent may be obtained for five cents each, by addressing the "Commissioner of Patents, Washington, D. C."